April 5, 1932.  W. T. PRITCHARD  1,852,756
LUBRICATING DEVICE
Filed March 16, 1931

INVENTOR
W. T. PRITCHARD
BY P. C. Smith
ATTORNEY

Patented Apr. 5, 1932

1,852,756

UNITED STATES PATENT OFFICE

WILLIAM T. PRITCHARD, OF MAPLEWOOD, NEW JERSEY, ASSIGNOR TO BELL TELEPHONE LABORATORIES, INCORPORATED, OF NEW YORK, N. Y., A CORPORATION OF NEW YORK

LUBRICATING DEVICE

Application filed March 16, 1931. Serial No. 522,887.

This invention relates to improvements in lubricating devices and more particularly to what are commonly known as grease or oil guns.

In lubricating devices especially adapted for oiling light bearings and the like it is important to make certain that only a measured quantity of lubricant is applied to the bearing. The oil gun used for such a purpose must, therefore, be free from any leakage to prevent lubricating fluid, escaping from the movable parts of the gun, from dropping on the bearing and thereby cause more lubricant to be applied to the bearing than is desirable and otherwise avoid possibilities of lubricant reaching parts of apparatus which are to be kept clean.

It is, accordingly, the object of this invention to improve the construction of lubricating devices so as to render them free from any possibility of leakage and thereby insure the application of only such lubricant as is ejected from the outlet nozzle.

In accordance with the embodiment of the invention herein shown and described the lubricating device comprises a cylinder having a feed tube and outlet port with a cup-like catch basin at the top of the said cylinder, a piston movable in the cylinder and an air tight hollow casing for holding a supply of lubricant, the said casing being at right angles to the cylinder and with the inlet passage projecting thereinto. The catch basin is connected with the hollow casing by an inclined passage or return vent while in the catch basin itself rest two suitable washers with center holes for the passage of the piston and which, together, form a cupola housing for the removal of lubricant from the piston.

The downward movement of the piston serves to eject the contents of the cylinder through the outlet passage and, at the same time directly closes the inlet passage without the use of valves or the like. The upward stroke of the piston opens the inlet passage and whatever film of oil has formed around the piston is scraped off by one of the two washers: The oil which is removed by the scraping action of the washer collects in the catch basin. The upward stroke of the piston reduces the pressure in the cylinder and since the piston is not air tight with respect to the exposed top surface of the cylinder, air at atmospheric pressure forces its way into the cylinder and into the catch basin where it then enters the hollow casing through the return vent passage carrying with it whatever lubricant has accumulated in the catch basin. The increased pressure within the hollow basin now forces the ejection of lubricant into the ejection cylinder by way of the inlet passage.

In this manner lubricating fluid never gets further than the catch basin since, with each upward stroke of the piston, the in-rush of air into the reservoir by way of the cylinder walls and catch basin always carries with it, through the return vent passage, whatever lubricant has collected in the basin and thereby prevents any leakage of lubricant around the top surfaces of the cylinder.

Figure 1:
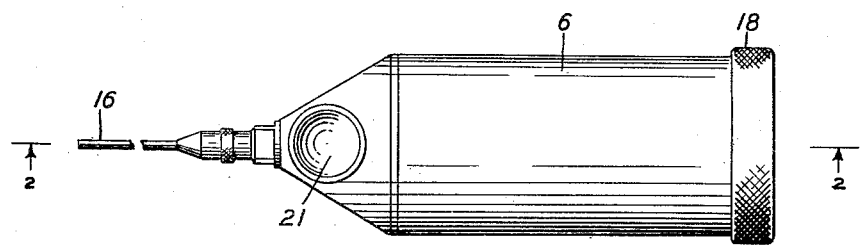
Fig. 1 is a plan view of a lubricating device in accordance with the invention.
Figure 2:
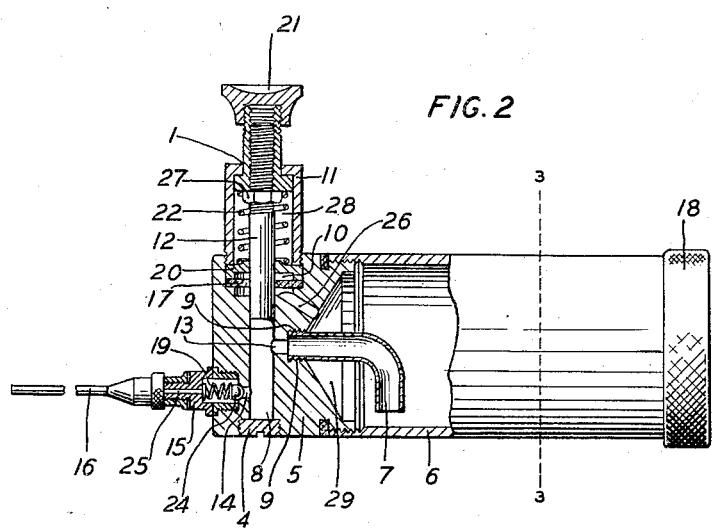
Fig. 2 is a view partly in section along the line 2—2 of Fig. 1.
Figure 3:
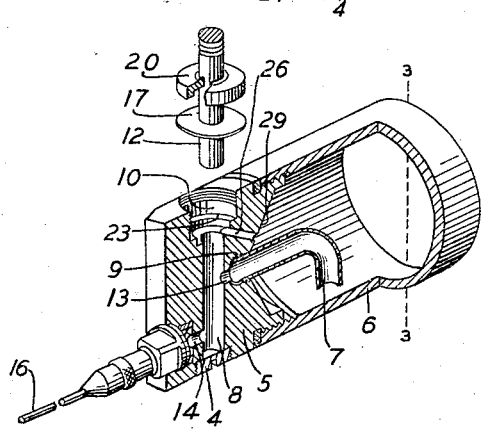
Fig. 3 is a perspective longitudinal view, partly in section along the line 2—2 of Fig. 1, of that part of the lubricating device which is to the left of the line 3—3 of Fig. 2.

Referring to the drawings in detail, a reservoir 6 is provided with a closed cap 18 at one end which serves as a container for a lubricant, such as oil. The reservoir 6 is threaded at its other end for the reception of a head 5 which is cooperatively tapped at the end connecting with the reservoir and is formed with a transverse bore or cylinder 8, the bottom of which is closed with a screw 4. The head 5 terminates at its right end in a hollow cone 29 the apex of which is formed of a threaded opening 9 for the reception of one end of a removable feed tube 7 the other end of which extends into the reservoir. A small aperature 13 connects the transverse cylinder 8 and the horizontal opening 9 providing thereby direct access from the reservoir to the cylinder by way of the feed tube 7. The cylinder 8 terminates at its upper end in a circular chamber or catch basin 10. The basin 10 is divided into two parts by a circular shelf 23; a constricted lower basin and an enlarged threaded upper one. From the right hand edge of the bottom of the lower basin an inclined bore or return vent 26 extends through the conical surface 29 and establishes another communicating channel between the cylinder and the reservoir. The upper periphery of basin 10 is threaded for the reception of the cup-shaped plug 11 through which piston rod 12 slides. Fitting the threaded chamber and centrally perforated for the passage of the piston 12 are two washers, namely, base washer 17 and top-washer 20. Base washer 17 is made of any suitable flexible material, such as leather, and rests on the circular shelf 23 which divides the basin, the said two parts of the basin being thus separated by the partition formed by the base washer 17. The top washer 20 is preferably of metal, rests with its base on the circular contour of the base washer 17 and loosely fills the upper basin. Formed in the head, on an axis parallel to but opposite with relation to the inlet passage 13, is an outlet passage 14 which communicates with cylinder 8 and is fitted with a threaded nipple 15 to which a long small bore nozzle 16 is attached. The threaded nipple contains two coaxial bores, a larger one aligned with the outlet passage 14 containing the spring 19 and ball 24 forming a well known ball-valve, and a smaller bore 25 which communicates directly with the inner larger bore at one end and with nozzle 16 at the other.

The piston 12 is slidably fitted in the cylinder 8 and is threaded at one end to fit into the internally threaded portion of the piston rod 1. A nut 27, fitting on the threaded portion of the piston 12, is provided to lock the piston after it has been set to occupy a desired position in the cylinder. A button 21 is provided at the upper portion of the piston rod 1 so that the piston may be moved forward in the cylinder by applying pressure to the button with the thumb. A compression spring 22, resting with its base on the top of washer 20 and its head on the under part of piston rod 1, serves to move the piston on its backward stroke.

In use, the reservoir 6 is removed from the head 5 and filled with lubricant, after which it is reconnected to the head. When the piston is pushed downward on its forward stroke, aperture 13 is closed by the piston. The contents of cylinder 8 force ball-valve 24 away from the aperture 14 and the said contents are ejected out of the device through nozzle 16. The release of the pressure on button 21 causes spring 22 to lift the piston rod back thereby, prior to the opening of aperture 13 by the piston, creating a vacuum in the lower portion of cylinder 8. Atmospheric pressure and spring 19 operate the ball-valve 24 to close aperture 14 and, due to the fact that the top opening of plug 11 through which piston rod 1 slides, is not air tight, air enters through the aperture and fills chamber 28 of the plug. The washers 17 and 20 are also not air tight and the air continues down into the basin 10 and enters the reservoir 6 through the return vent 26. As the piston is lifted on its backward stroke and aperture 13 is opened, the air in the reservoir which entered through the return vent 26 forces the lubricant through the feed tube 7 into the cylinder and refills it. Ball-valve 24 will not operate at this time since the air pressure operating upon the lubricant is equal to that operating upon the valve through the nozzle 16. Aperture 14, therefore, will remain closed. The next downward stroke of the piston will then serve to eject the lubricant out of the cylinder in the manner just described.

It will be noted that the surface of the piston is in intimate contact with the lubricant and the piston, on its backward stroke, will have a film of lubricant over its surface. Since, however, washer 17 fits around the piston and the top washer 20 holds the base washer firmly on the shelf 23, the lubricant is removed from the piston by the wiping action of the washer against the piston surface. The base washer, due to its flexibility and the fact that it is held down along its outer surface by the top washer, has imparted to it a diaphragm action which has a tendency to cause the surface of the base washer in contact with the surface of the piston to creep along with the piston and thereby result in better wiping action. The oil thus removed from the piston collects around the edges of the lower partition of basin 10 and piston 12 is thus rendered practically free from lubricant. With the in-rush of air on the upward stroke of the piston, such lubricant as is collected in the lower chamber is forced, along with the air, back into the reservoir through the return vent 26.

In this manner all possibilities of leakage due to the introduction of lubricant into the cylinder plug chamber 28 is thus eliminated and hence no possibility exists for lubricant emerging to the outside of the lubricating device by any contact with piston rod 1. The only opening through which the lubricant may escape the lubricating device is through the ejection nozzle 16 and that only at the time when pressure is applied to button 21.

What is claimed is:

1. A lubricating device comprising a cylindrical ejection bore terminating at one end in a catch basin for the collection of air and lubricant, a cooperating reciprocating plunger for said bore, a lubricant reservoir, and a return vent connecting said catch basin with said reservoir whereby on the upstroke of said plunger the air and lubricant collected in said basin pass through said return vent into said reservoir.

2. A lubricating device comprising a cylindrical ejection bore, a lubricant reservoir, a cooperating reciprocating plunger for said bore, a flexible washer for said plunger, means for holding said washer stationary around its contour for imparting a diaphragm action to said washer when said plunger is operated and a return vent connecting said cylindrical bore with said reservoir whereby upon the upstroke of said plunger lubricaint is removed from the surface of said plunger by the action of said washer and returned by said vent to said reservoir.

3. A lubricating device comprising a cylindrical ejection bore terminating at one end in a catch basin for the collection of air and lubricant, a lubricant reservoir, a cooperating reciprocating plunger for said bore, a flexible washer for said plunger normally resting on said catch basin, means for holding said washer stationary around its contour on said catch basin for imparting a diaphragm action to said washer when said plunger is operated and a return vent connecting said cylindrical bore with said reservoir whereby upon the upstroke of said plunger, lubricant is removed from the surface of said plunger by the action of said washer, collected in said catch basin and returned through said vent to said reservoir.

4. A lubricating device comprising a cylindrical ejection bore terminating at one of its ends in a catch basin for the collection of air and lubricant, a lubricant reservoir, a feed tube connecting said bore with said reservoir, a cooperating reciprocating plunger for said bore, a flexible washer for said plunger, means for holding said washer stationary around its contour for imparting a diaphragm action to said washer when said plunger is operated and a return vent connecting said cylindrical bore with said reservoir whereby upon the upstroke of said plunger lubricant is removed from the surface of said plunger by the action of said washer, collected in said basin and returned through said vent to said reservoir while lubricant passes from said reservoir to said cylindrical bore to said feed tube.

5. A lubricating device comprising a head having a cylindrical bore, a catch basin at the upper end thereof, an outlet port, a feed tube and a return vent, a hollow casing connected to said head with said feed tube projecting therein and said return vent connecting said catch basin with said casing, the said feed tube adapted to supply a lubricant from said casing to said bore, and said return vent adapted to pass fluids from said catch basin to said hollow casing, a reciprocating plunger within said bore, and a ball-valve within said outlet port to prevent the lubricant from being withdrawn into said bore.

6. A lubricating device comprising a head having a cylindrical bore, a catch basin at the upper end thereof, an outlet port, a feed tube and a return vent, a hollow casing connected to said head with said feed tube projecting therein and said return vent connecting said catch basin with said casing, the said feed tube adapted to supply a lubricant from said casing to said bore, and said return vent adapted to pass fluids from said catch basin to said hollow casing, a reciprocating plunger within said bore, and wiping washers surrounding said plunger and positioned in said catch basin, whereby with each upward stroke of said plunger lubricant is removed from the surface of said plunger by the action of said washers and such lubricant as is not removed thereby is entrapped in said catch basin and emptied into said hollow casing and whereby other lubricant is forced to enter said cylindrical bore through said feed tube.

In witness whereof, I hereunto subscribe my name this 13th day of March, 1931.

WILLIAM T. PRITCHARD.